United States Patent
Hong

(10) Patent No.: US 11,252,640 B2
(45) Date of Patent: Feb. 15, 2022

(54) METHOD, APPARATUS, DEVICE AND BASE STATION FOR IMPLEMENTING INTERNET OF THINGS DEVICE BOOTSTRAPPING

(71) Applicant: BEIJING XIAOMI MOBILE SOFTWARE CO., LTD., Beijing (CN)

(72) Inventor: Wei Hong, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 0 days.

(21) Appl. No.: 16/498,659

(22) PCT Filed: Apr. 6, 2017

(86) PCT No.: PCT/CN2017/079568
§ 371 (c)(1),
(2) Date: Sep. 27, 2019

(87) PCT Pub. No.: WO2018/184170
PCT Pub. Date: Oct. 11, 2018

(65) Prior Publication Data
US 2020/0053631 A1    Feb. 13, 2020

(51) Int. Cl.
*H04W 48/08* (2009.01)
*H04W 76/14* (2018.01)
(Continued)

(52) U.S. Cl.
CPC ............ *H04W 48/08* (2013.01); *H04L 67/12* (2013.01); *H04W 76/14* (2018.02); *H04W 84/042* (2013.01); *H04W 88/08* (2013.01)

(58) Field of Classification Search
CPC ...... H04L 67/12; H04W 48/08; H04W 48/16; H04W 4/50; H04W 4/70; H04W 4/80;
(Continued)

(56) References Cited

U.S. PATENT DOCUMENTS

2013/0012221 A1    1/2013   Zou et al.
2017/0041917 A1*   2/2017   Agiwal .................. H04W 8/005
(Continued)

FOREIGN PATENT DOCUMENTS

CN    102684775 A    9/2012
CN    102714861 A    10/2012
(Continued)

OTHER PUBLICATIONS

First Office Action and Search Report issued in Chinese Application No. 201780000195.1, dated Sep. 27, 2020 with English translation, (18p).
(Continued)

*Primary Examiner* — Kan Yuen
(74) *Attorney, Agent, or Firm* — Arch & Lake LLP

(57) ABSTRACT

A method, an apparatus, a device, and a base station are provided for implementing IoT device bootstrapping. The method may include: receiving bootstrapping information of a first device sent by the first device; determining a second device to be connected with the first device; sending the bootstrapping information of the first device to the second device. The technology of the present disclosure can realize IoT device bootstrapping based on cellular IoT, and improve efficiency of establishing a fast connection of the IoT device supporting the cellular IoT.

12 Claims, 7 Drawing Sheets

(51) Int. Cl.
*H04L 29/08* (2006.01)
*H04W 84/04* (2009.01)
*H04W 88/08* (2009.01)

(58) Field of Classification Search
CPC ... H04W 76/10; H04W 76/14; H04W 84/042; H04W 88/08; H04W 92/16; H04W 92/18; H04W 8/005
See application file for complete search history.

(56) References Cited

U.S. PATENT DOCUMENTS

| | | | | |
|---|---|---|---|---|
| 2017/0171607 A1* | 6/2017 | Britt | ......................... | H04W 4/80 |
| 2017/0257760 A1* | 9/2017 | Moran | ................... | H04L 63/107 |
| 2017/0257819 A1* | 9/2017 | McCann | ................ | H04W 48/14 |
| 2018/0109381 A1* | 4/2018 | Cammarota | ...... | H04W 12/0471 |
| 2019/0020998 A1* | 1/2019 | Takahashi | ............. | H04W 76/20 |

FOREIGN PATENT DOCUMENTS

| | | | | |
|---|---|---|---|---|
| CN | 103843446 A | | 6/2014 | |
| CN | 104105160 A | * | 10/2014 | ............ H04W 48/08 |
| CN | 104105160 A | | 10/2014 | |
| CN | 104798432 A | | 7/2015 | |
| CN | 105657785 A | | 6/2016 | |
| WO | 2016140416 A1 | | 9/2016 | |
| WO | 2016165737 A1 | | 10/2016 | |

OTHER PUBLICATIONS

International Preliminary Report on Patentability and Written Opinion issued in PCT Application No. PCT/CN2017/079568 dated Dec. 28, 2017 with English translation, (9p).

Huawei, HiSilicon, China Unicom, CATR, "Credential Management and Remote Credential Provisioning", 3GPP TSG SA WG3 (Security) Meeting #83, San Jose Del Cabo, Mexico, S3-160820, May 9-13, 2016, (4p).

International Search Report Issued in Application No. PCT/CN2017/079568, dated Dec. 28, 2017, WIPO, (4p).

* cited by examiner

METHOD, APPARATUS, DEVICE AND BASE STATION FOR IMPLEMENTING INTERNET OF THINGS DEVICE BOOTSTRAPPING

CROSS REFERENCE TO RELATED APPLICATIONS

The present application is the U.S. national phase of PCT Application No. PCT/CN2017/079568 filed on Apr. 6, 2017, which is incorporated herein by reference in its entirety.

TECHNICAL FIELD

The present disclosure relates to the field of cellular Internet of things (IoT) technologies, and in particular, to a method, an apparatus, a device, and a base station for implementing IoT device bootstrapping.

BACKGROUND

IoT is to connect all items with the internet based on an agreed protocol by information sensing devices, such as radio frequency identification, infrared sensors, global positioning systems, laser scanners, to exchange information and communicate, thereby realizing intelligent identification, location, tracking, monitoring and management. As the main driving force for development of mobile communication, the IoT can be applied in all major fields to realize interconnection of all things. In order to meet requirements for connections of IoT devices in large scale, various standardization organizations have defined corresponding IoT standards to support IoT devices. For example, the 3rd Generation Partnership Project (3GPP) defines enhanced Machine Type Communication (e-MTC) technology based on a licensed frequency band, Narrow Band IoT (NB-IoT) technology and the likes in the Radio Access Network (RAN). In order to enable different IoT devices to be quickly connected, configured, and networked, the Wireless-Fidelity (Wi-Fi) Alliance (WFA) defines Device Provisioning Protocol (DPP) technology.

In the related art, the DPP technology can adopt five bootstrapping methods, such as a matrix QR code, Near Field Communication (NFC), Wi-Fi aware, and Bluetooth Low Energy (BLE), and user input string, to achieve information bootstrapping for establishing a fast connection by an IoT device. With development of cellular IoT (CIoT) technology, more and more IoT devices will support CIoT technology. The five bootstrapping methods using the DPP technology in the related art have limitations, which to some extent, increases difficulty of popularizing CIoT-supported IoT devices.

SUMMARY

In order to overcome the problems in the related art, in examples of the present disclosure, a method, an apparatus, a device, and a base station are provided for implementing IoT device bootstrapping, so that IoT device bootstrapping based on CIoT is implemented. Thus, the efficiency of establishing a fast connection by an CIoT-supported IoT device is improved.

According to a first aspect of the present disclosure, a method of implementing IoT device bootstrapping is provided, including:

receiving bootstrapping information of a first device sent by the first device;

determining a second device to be connected with the first device; and sending the bootstrapping information of the first device to the second device.

In an example, the method further includes:

receiving bootstrapping information of the second device sent by the second device.

In an example, the method further includes:

sending the bootstrapping information of the second device to the first device.

In an example, determining the second device to be connected with the first device includes:

receiving a request message sent by the first device;

analyzing the request message to obtain identification information of a device to be connected with the first device; and determining the second device to be connected with the first device based on the identification information of the device.

In an example, determining the second device to be connected with the first device includes:

determining an IoT device that meets a preset condition among currently accessed IoT devices as the second device.

According to a second aspect of the present disclosure, a method of implementing IoT device bootstrapping is provided, including:

receiving bootstrapping information of a second device sent by a CIoT base station; and establishing an IoT connection with the second device based on the bootstrapping information of the second device, where the second device obtains bootstrapping information of a first device through the CIoT base station.

In an example, the method further includes:

sending bootstrapping information of the first device to the CIoT base station.

In an example, sending the bootstrapping information of the first device to the CIoT device includes:

sending the bootstrapping information of the first device to the CIoT base station in a process of accessing the CIoT base station or when an IoT connection to be established with another IoT device.

In an example, sending the bootstrapping information of the first device to the CIoT device includes:

receiving a request message sent by the CIoT base station for acquiring the bootstrapping information of the first device; and sending a response message corresponding to the request message to the CIoT base station, where the response message carries the bootstrapping information of the first device.

According to a third aspect of the present disclosure, an apparatus of implementing IoT device bootstrapping is provided, including:

a first receiving module, configured to receive bootstrapping information of a first device sent by the first device;

a first determining module, configured to determine a second device to be connected with the first device; and a first sending module, configured to send the bootstrapping information of the first device received by the first receiving module to the second device determined by the first determining module.

In an example, the apparatus further includes:

a second receiving module, configured to receive bootstrapping information of the second device sent by the second device.

In an example, the apparatus further includes:

a second sending module, configured to send the bootstrapping information of the second device to the first device.

In an example, the first determining module includes:

a first receiving sub-module, configured to receive a request message sent by the first device;

an analyzing sub-module, configured to analyze the request message received by the first receiving sub-module to obtain identification information of a device to be connected with the first device; and a first determining sub-module, configured to determine the second device to be connected with the first device based on the identification information of the device obtained by the analyzing sub-module.

In an example, the first determining module includes:

a second determining sub-module, configured to determine an IoT device that meets a preset condition among currently accessed IoT devices as the second device.

According to a fourth aspect of the present disclosure, an apparatus of implementing IoT device bootstrapping is provided, including:

a third receiving module, configured to receive bootstrapping information of a second device sent by a CIoT base station; and a connection establishing module, configured to establish an IoT connection with the second device based on the bootstrapping information of the second device, where the second device obtains bootstrapping information of the first device via the CIoT base station.

In an example, the apparatus further includes:

a third sending module, configured to send the bootstrapping information of the first device to the CIoT base station.

In an example, the third sending module includes:

a first sending sub-module, configured to send the bootstrapping information of the first device to the CIoT base station in a process of accessing the CIoT base station or when an IoT connection to be established with another IoT device.

In an example, the third sending module includes:

a second receiving sub-module, configured to receive a request message sent by the CIoT base station for acquiring the bootstrapping information of the first device; and a second sending sub-module, configured to send a response message corresponding to the request message received by the second receiving sub-module to the CIoT base station, where the response message carries the bootstrapping information of the first device.

According to a fifth aspect of the present disclosure, a base station is provided, including:

a processor; and
a memory for storing processor executable instructions;
where the processor is configured to:
receive bootstrapping information of a first device sent by the first device;
determine a second device to be connected with the first device; and
send the bootstrapping information of the first device to the second device.

According to a sixth aspect of the present disclosure, a device is provided, including:

a processor; and
a memory for storing processor executable instructions;
where the processor is configured to:
receive bootstrapping information of a second device sent by a CIoT base station; and establish an IoT connection with the second device based on the bootstrapping information of the second device, where the second device obtains bootstrapping information of a first device through the CIoT base station.

According to a seventh aspect of the present disclosure, a machine readable storage medium is provided, the machine readable storage medium stores machine instructions, where the instructions are executed by a processor to implement the following operations:

receiving bootstrapping information of a first device sent by the first device;

determining a second device to be connected with the first device; and sending the bootstrapping information of the first device to the second device.

According to an eighth aspect of the present disclosure, a machine readable storage medium is provided, the machine readable storage medium stores machine instructions, where the instructions are executed by a processor to implement the following operations:

receiving bootstrapping information of a second device sent by a CIoT base station; and establishing an IoT connection with the second device based on the bootstrapping information of the second device, where the second device obtains bootstrapping information of a first device through the CIoT base station.

The technical solutions provided in the examples of the present disclosure may have the following beneficial effects.

When receiving the bootstrapping information of the first device sent by the first device, the CIoT base station may determine the second device which will establish a fast connection with the first device, and then send bootstrapping information of the second device to the first device, and send the bootstrapping information of the first device to the second device, thereby implementing bootstrapping of the first device and the second device and avoiding the limitations of the bootstrapping method using the prior art.

The above general description and the following detailed description are intended to be illustrative and not restrictive.

BRIEF DESCRIPTION OF THE DRAWINGS

The accompanying drawings, which are incorporated in and constitute a part of the specification, illustrate examples consistent with the present disclosure and, together with the description, serve to explain the principles of the disclosure.

DETAILED DESCRIPTION OF THE EMBODIMENTS

Figure 1A:
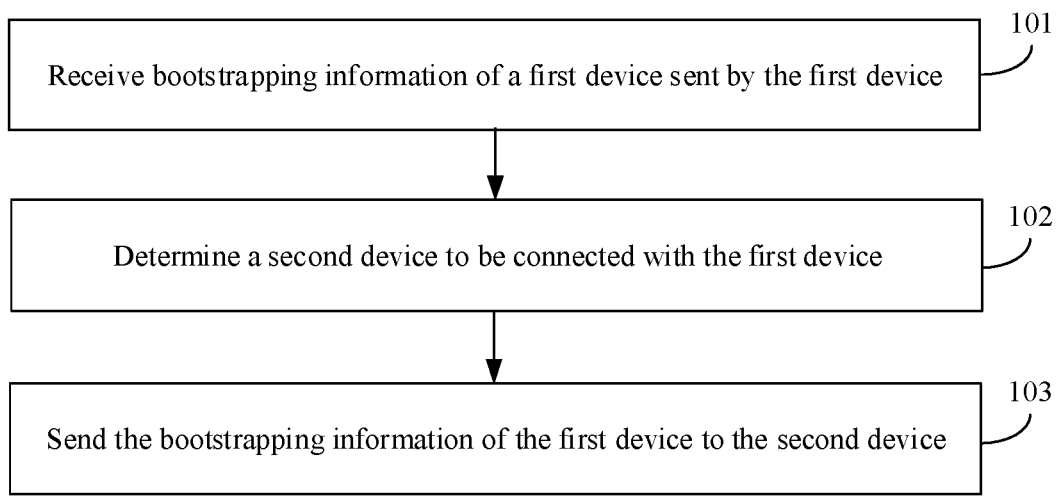
FIG. 1A is a flowchart illustrating a method of implementing IoT device bootstrapping according to an example.

Examples will be described in detail here with the examples thereof expressed in the drawings. Where the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

Figure 1B:
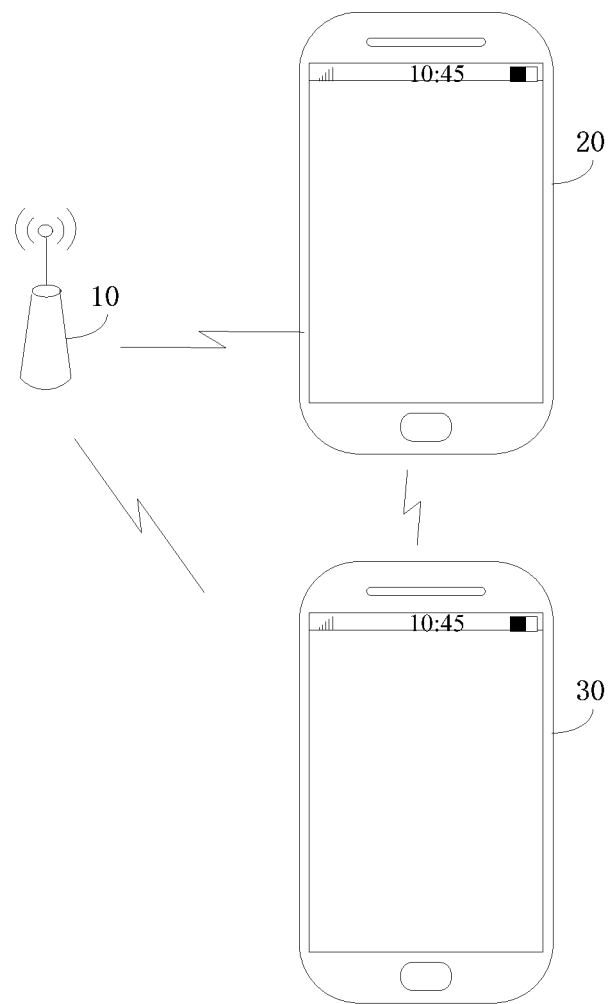
FIG. 1B is a scenario diagram illustrating a method of implementing IoT device bootstrapping according to an example.

FIG. 1A is a flowchart illustrating a method of implementing IoT device bootstrapping according to an example. FIG. 1B is a scenario diagram illustrating a method of implementing IoT device bootstrapping according to an example. The method of implementing IoT device bootstrapping can be applied to a CIoT base station. As shown in FIG. 1A, the method of implementing IoT device bootstrapping includes following steps 101-103.

In step 101, bootstrapping information of a first device sent by the first device is received.

In an example, a CIoT-supported IoT device can be implemented bootstrapping with CIoT technology based on a licensed frequency band. That is, necessary information required for DPP authentication and configuration, such as a public bootstrap key and/or a global operating class and/or a channel number list, is acquired by a CIoT technology based on a licensed frequency band.

In step 102, a second device to be connected with the first device is determined.

In an example, a CIoT base station may determine, based on a received request message sent by the first device, a device to be connected with the first device. This may refer to the example shown in FIG. 3, which is not described in detail here.

In an example, the CIoT base station may further determine the second device to be connected with the first device based on a preset condition. For example, if there is an accessed IoT device within the range of a preset distance threshold around the first device, the IoT device within the range of a preset distance threshold may be determined as the second device to be connected with the first device.

In an example, the preset distance threshold may be determined based on an empirical value. For example, if IoT devices within a range of 3 meters can all establish IoT connections, the preset distance threshold may be set to 3 meters.

In an example, the preset condition may further include other conditions. For example, if an IoT device that is accessed within a preset time threshold usually establishes an IoT connection, the CIoT base station may determine the second device to be connected with the first device based on the preset time threshold.

In an example, the CIoT base station may further determine the second device to be connected with the first device based on other preset conditions. The specific contents of the preset conditions are limited herein.

In an example, more than one second device to be connected with the first device may exist.

In step 103, the bootstrapping information of the first device is sent to the second device.

In an exemplary scenario, as shown in FIG. 1B, in the scenario shown in FIG. 1B, a CIoT base station 10, a first device 20 (the first device may be an CIoT-supported electronic device, such as a smartphone, a tablet computer, and so on), and a second device 30 (the second device may be an CIoT-supported electronic device, such as a smartphone, a tablet computer, and so on) are included. When receiving bootstrapping information of the first device 20, the CIoT base station 10 can determine the second device 30 that will establish a fast IoT connection with the first device 20, send bootstrapping information of the second device 30 to the first device 20, and send the bootstrapping information of the first device 20 to the second device 30, thereby implementing the first device 20 and the second device 30 bootstrapping and avoiding the limitations of the bootstrapping method using in the prior art.

In this example, with the foregoing steps 101-103, the CIoT base station send the bootstrapping information of the second device to the first device, and send the bootstrapping information of the first device to the second device, thereby implementing IoT device bootstrapping based on CIoT.

In an example, the method of implementing IoT device bootstrapping may further include:

receiving bootstrapping information of the second device sent by the second device.

In an example, the method of implementing IoT device bootstrapping may further include:

sending the bootstrapping information of the second device to the first device.

In an example, determining the second device to be connected with the first device includes:

receiving a request message sent by the first device;

analyzing the request message to obtain identification information of a device to be connected with the first device; and determining the second device to be connected with the first device based on the identification information of the device.

In an example, determining the second device to be connected with the first device includes:

determining an IoT device that meets a preset condition among currently accessed IoT devices as the second device.

For details on how to implement IoT device bootstrapping, please refer to subsequent examples.

The technical solutions provided in the examples of the present disclosure are described below by using specific examples.

Figure 2:
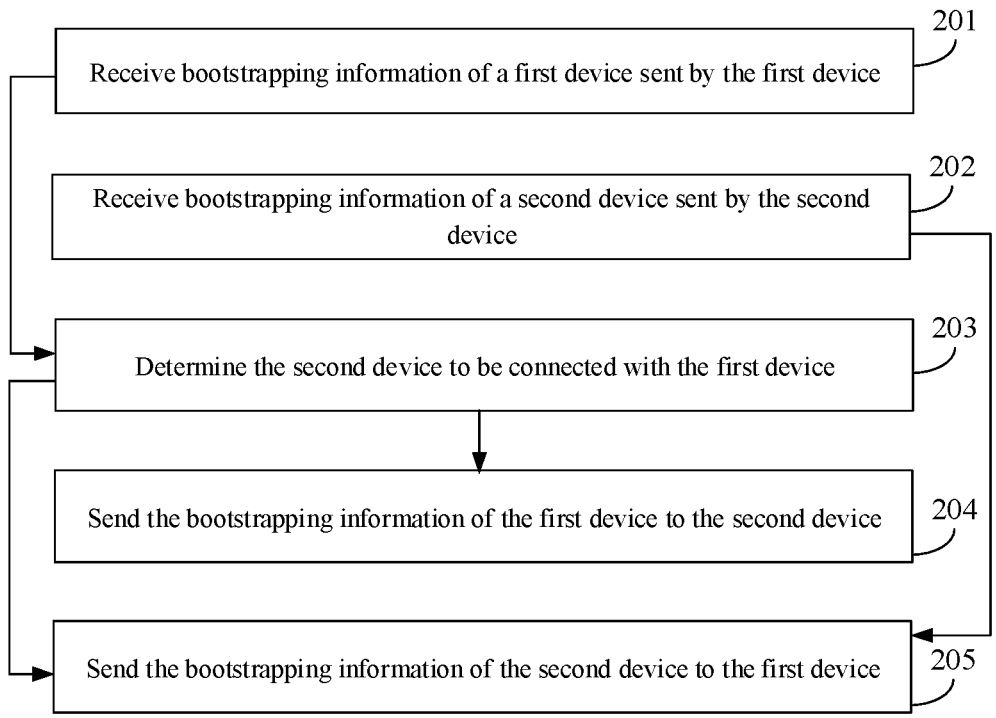
FIG. 2 is a flowchart illustrating another method of implementing IoT device bootstrapping according to an example.

FIG. 2 is a flowchart illustrating another method of implementing IoT device bootstrapping according to an example. This example utilizes the foregoing method provided in an example of the present disclosure, and takes bootstrapping between a first device and a second devices implemented by a CIoT base station as an example for exemplary description. As shown in FIG. 2, the following steps are included.

In step 201, bootstrapping information of the first device sent by the first device is received, and step 203 is executed.

In step 202, bootstrapping information of the second device sent by the second device is received, and step 205 is executed.

In step 203, the second device to be connected with the first device is determined, and steps 204 and 205 are executed.

In step 204, the bootstrapping information of the first device is sent to the second device.

In an example, steps 201, 203 and 204, which can refer to steps 101-103 in the example shown in FIG. 1A, will not be described in detail here.

In step 205, the bootstrapping information of the second device is sent to the first device.

In an example, if the bootstrapping information of the second device is contained in a storage medium, the bootstrapping information of the second device in the storage medium is directly read and sent to the first device.

In an example, if the bootstrapping information of the second device is not contained in a storage medium, a request message for acquiring the bootstrapping information of the second device may be sent to the second device. After receiving a response message containing the bootstrapping information of the second device, the response message is analyzed to obtain the bootstrapping information of the second device, and the information is sent to the first device.

In this example, with the foregoing steps 201-step 205, the CIoT base station send the bootstrapping information of the second device to the first device, and send the bootstrapping information of the first device to the second device, thereby implementing IoT device bootstrapping based on CIoT.

Figure 3:
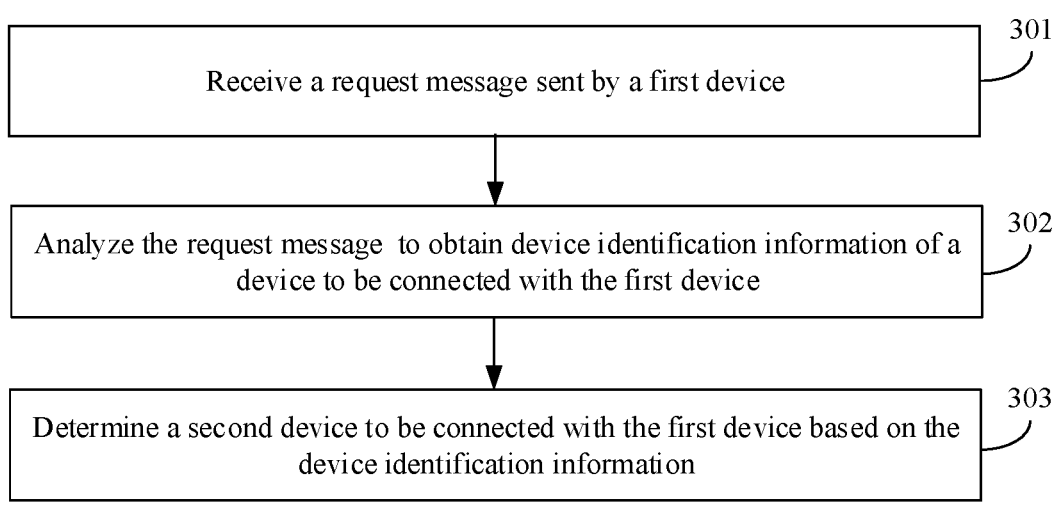
FIG. 3 is a flowchart illustrating a method of determining a second device to be connected with a first device according to an example.

FIG. 3 is a flowchart illustrating a method of determining a second device to be connected with a first device according to an example. This example utilizes the foregoing method provided in an example of the present disclosure, and takes determining the second device to be connected with the first device by a CIoT base station based on a received request message sent by the first device as an example for exemplary description. As shown in FIG. 3, the following steps are included.

In step 301, a request message sent by a first device is received.

In step 302, the request message is analyzed to obtain identification information of a device to be connected with the first device.

In an example, the identification information of the device may be information, such as a device name or a device identifier (ID) of the device, for uniquely identifying the device.

In step 303, a second device to be connected with the first device is determined based on the identification information of the device.

In this example, with the foregoing steps 301-303, the base station can determine the second device to be connected with the first device based on the received request message sent by the first device.

Figure 4:
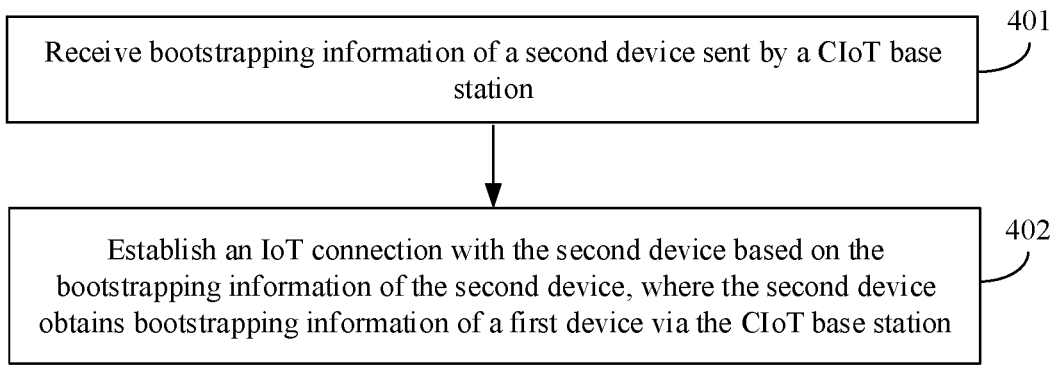
FIG. 4 is a flowchart illustrating a method of implementing IoT device bootstrapping according to an example.

FIG. 4 is a flowchart illustrating a method of implementing IoT device bootstrapping according to an example. The method of implementing IoT device bootstrapping can be applied to a CIoT-supported first device (such as a smartphone, a tablet computer, and so on). As shown in FIG. 4, the following steps 401-402 are included.

In step 401, bootstrapping information of a second device sent by a CIoT base station is received.

In an example, a CIoT-supported IoT device can be implemented bootstrapping with CIoT technology based on a licensed frequency band. That is, necessary information required for DPP authentication and configuration, such as a public bootstrap key and/or a global operating class and/or a channel number list, is acquired by a CIoT technology based on a licensed frequency band.

In an example, the CIoT base station may actively send the bootstrapping information of the second device to the first device. In another example, when receiving a request message for acquiring the bootstrapping information of the second device sent by the first device, the CIoT base station may send the bootstrapping information of the second device to the first device.

In step 402, based on the bootstrapping information of the second device, an IoT connection is established with the second device, where the second device obtains the bootstrapping information of the first device via the CIoT base station.

In an example, after acquiring the bootstrapping information of the second device, the first device may establish an IoT connection with the second device based on the bootstrapping information of the second device.

In an exemplary scenario, as shown in FIG. 1B, in the scenario shown in FIG. 1B, a CIoT base station 10, a first device 20, and a second device 30 are included. The CIoT base station 10 can send bootstrapping information of the second device 30 to the first device 20, so that the first device 20 acquires the bootstrapping information of the second device. The first device 20 also send its own bootstrapping information to the second device via the CIoT base station 10, so that an IoT connection establishing between the first device and the second device is implemented.

In this example, with the foregoing steps 401-402, the CIoT base station can send the bootstrapping information of the second device to the first device, so that the first device establishes a connection with the second device based on the bootstrapping information of the second device.

In an example, the method of implementing IoT device bootstrapping may further include:

sending bootstrapping information of the first device to the CIoT base station.

In an example, sending the bootstrapping information of the first device to the CIoT device includes:

sending the bootstrapping information of the first device to the CIoT base station in a process of accessing the CIoT base station or when an IoT connection to be established with another IoT device.

In an example, sending the bootstrapping information of the first device to the CIoT device includes:

receiving a request message sent by the CIoT base station for acquiring the bootstrapping information of the first device; and sending a response message corresponding to the request message to the CIoT base station, where the response message carries the bootstrapping information of the first device.

For details on how to implement IoT device bootstrapping, please refer to the subsequent examples.

The technical solutions provided in the examples of the present disclosure are described below by using specific examples.

Figure 5:
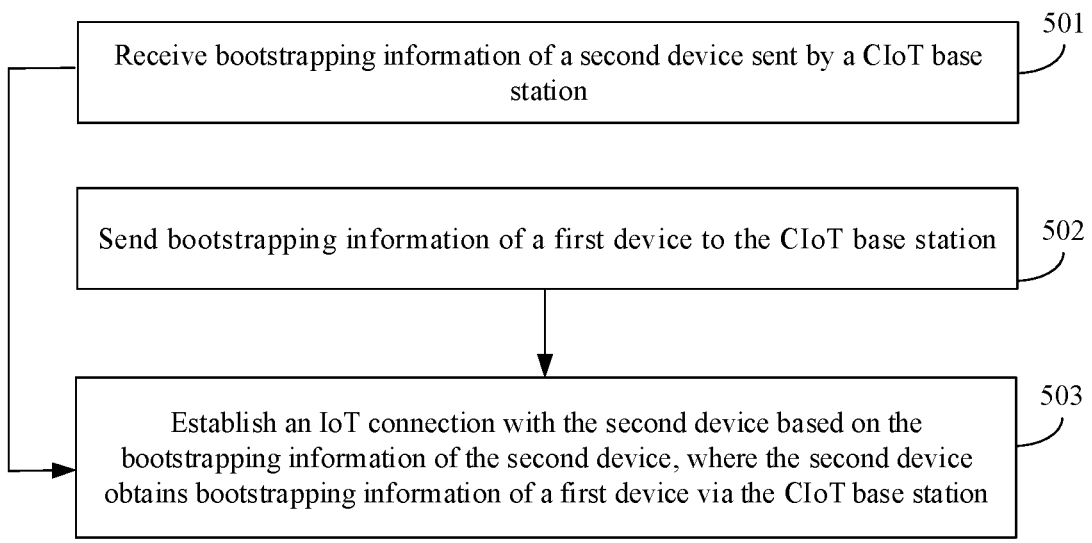
FIG. 5 is a flowchart illustrating another method of implementing IoT device bootstrapping according to an example.

FIG. 5 is a flowchart illustrating another method of implementing IoT device bootstrapping according to an example. This example utilizes the foregoing method provided in an example of the present disclosure, and takes implementing bootstrapping between a first device and a second device as an example for exemplary description. As shown in FIG. 5, the following steps are included.

In step 501, bootstrapping information of the second device sent by a CIoT base station is received, and step 503 is executed.

In an example, step 501, which can refer to step 401 in the example shown in FIG. 4, will not be described in detail here.

In step 502, bootstrapping information of the first device is sent to the CIoT base station, and the step 503 is executed.

In an example, the first device may actively send the bootstrapping information of the first device to the CIoT base station in the operation procedure of accessing the CIoT base station or after successfully accessed the CIoT base station.

In another example, when needing to establish an IoT connection with another IoT device, the first device may send a request message for acquiring the second device which will establish the IoT connection to the CIoT base station, where the request message carries the bootstrapping information of the first device.

In still another example, when receiving a request message sent by a CIoT base station for acquiring the bootstrapping information of the first device, the first device may further send the bootstrapping information of the first device in a response message based on the request message. The CIoT base station can generally send the request message for acquiring the bootstrapping information of the first device to the first device, when the CIoT base station receives a request for acquiring the bootstrapping information of the first device sent by another IoT device and the bootstrapping information of the first device is not stored in the base station.

In step 503, based on the bootstrapping information of the second device, an IoT connection with the second device is established, where the second device obtains the bootstrapping information of the first device via the CIoT base station.

In this example, with the foregoing steps 501-503, the CIoT base station can send the bootstrapping information of the second device to the first device, and send the bootstrapping information of the first device to the second device, thereby implementing IoT device bootstrapping based on CIoT.

Figure 6:
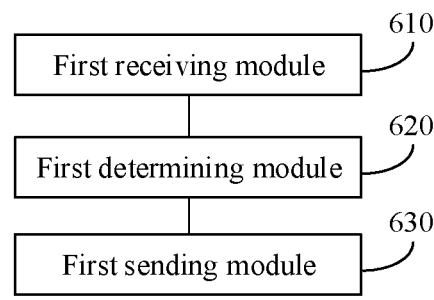
FIG. 6 is a block diagram illustrating an apparatus for implementing IoT device bootstrapping according to an example.

FIG. 6 is a block diagram illustrating an apparatus for implementing IoT device bootstrapping according to an example, and the apparatus is applied to a CIoT base station. As shown in FIG. 6, the apparatus for bootstrapping between IoT devices includes:

a first receiving module 610, configured to receive bootstrapping information of a first device sent by the first device;

a first determining module 620, configured to determine a second device to be connected with the first device; and a first sending module 630, configured to send the bootstrapping information of the first device received by the first receiving module 610 to the second device determined by the first determining module 620.

Figure 7:
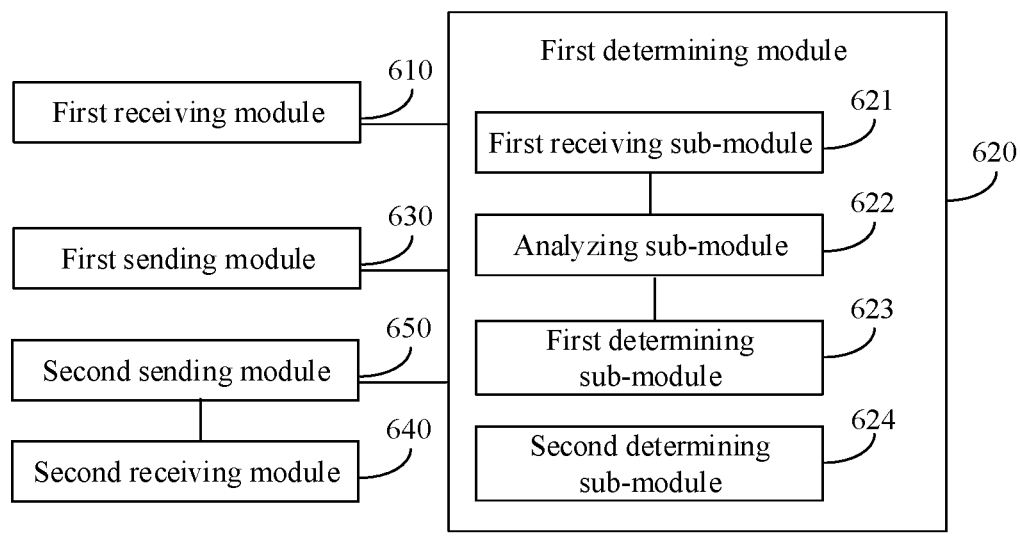
FIG. 7 is a block diagram illustrating another apparatus for implementing IoT device bootstrapping according to an example.

FIG. 7 is a block diagram illustrating another apparatus for implementing IoT device bootstrapping according to an example. As shown in FIG. 7, on the basis of the above example shown in FIG. 6, in an example, the apparatus further includes:

a second receiving module 640, configured to receive bootstrapping information of the second device sent by the second device.

In an example, the apparatus further includes:

a second sending module 650, configured to send the bootstrapping information of the second device to the first device.

In an example, the first determining module 620 includes:

a first receiving sub-module 621, configured to receive a request message sent by the first device;

an analyzing sub-module 622, configured to analyze the request message received by the first receiving sub-module 621 to obtain identification information of a device to be connected with the first device; and a first determining sub-module 623, configured to determine the second device to be connected with the first device based on the identification information of the device obtained by the analyzing sub-module 622.

In an example, the first determining module 620 includes:

a second determining sub-module 624, configured to determine an IoT device that meets a preset condition among currently accessed IoT devices as the second device.

Figure 8:
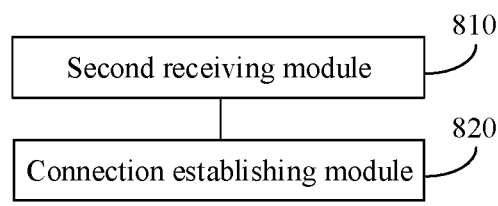
FIG. 8 is a block diagram illustrating an apparatus for implementing IoT device bootstrapping according to an example.

FIG. 8 is a block diagram illustrating an apparatus for implementing IoT device bootstrapping according to an example, and the apparatus is applied to a CIoT device. As shown in FIG. 8, the apparatus for bootstrapping between IoT devices includes:

a second receiving module 810, configured to receive bootstrapping information of a second device sent by a CIoT base station; and a connection establishing module 820, configured to establish an IoT connection with the second device based on the bootstrapping information of the second device, where the second device obtains bootstrapping information of the first device via the CIoT base station.

Figure 9:
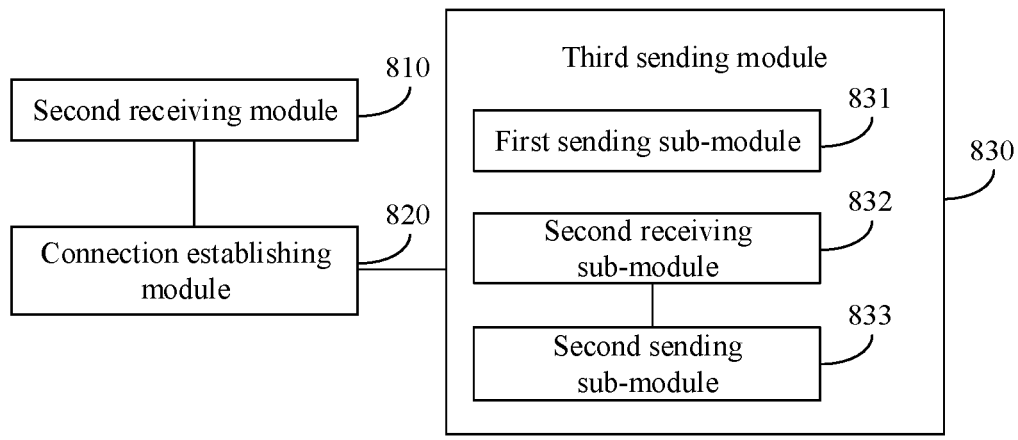
FIG. 9 is a block diagram illustrating another apparatus for implementing IoT device bootstrapping according to an example.

FIG. 9 is a block diagram illustrating another apparatus for implementing IoT device bootstrapping according to an example. As shown in FIG. 9, on the basis of the above example shown in FIG. 8, in an example, the apparatus further includes:

a third sending module 830, configured to send the bootstrapping information of the first device to the CIoT base station.

In an example, the third sending module 830 includes:

a first sending sub-module 831, configured to send the bootstrapping information of the first device to the CIoT base station in a process of accessing the CIoT base station or when an IoT connection to be established with another IoT device.

In an example, the third sending module 830 includes:

a second receiving sub-module 832, configured to receive a request message sent by the CIoT base station for acquiring the bootstrapping information of the first device; and a second sending sub-module 833, configured to send a response message corresponding to the request message received by the second receiving sub-module to the CIoT base station, where the response message carries the bootstrapping information of the first device.

The specific manners in which the respective modules of the apparatus in the above examples perform operations have been described in detail in the related method examples, and are not explained in detail herein.

Figure 10:
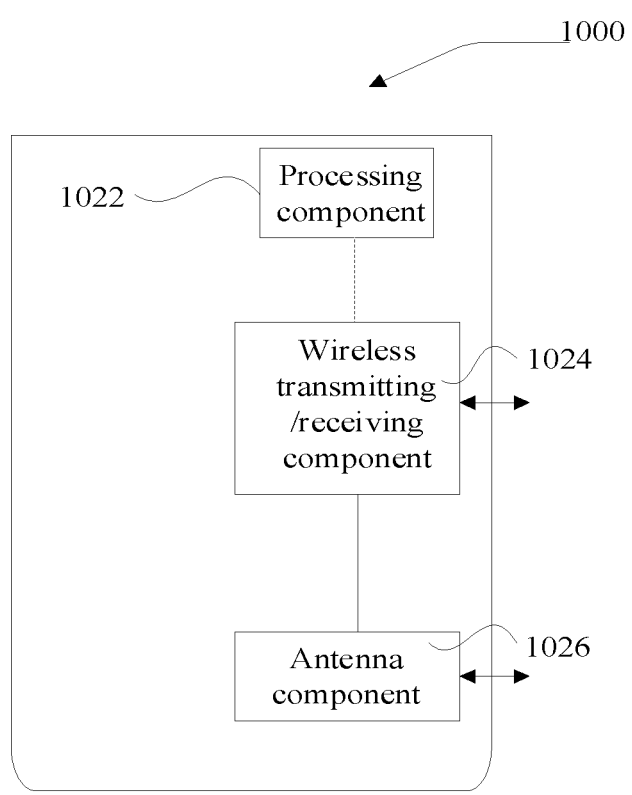
FIG. 10 is a block diagram illustrating an apparatus suitable for bootstrapping between IoT devices according to an example.

FIG. 10 is a block diagram illustrating an apparatus suitable for bootstrapping between IoT devices according to an example. An apparatus 1000 can be a base station. Referring to FIG. 10, the apparatus 1000 includes a processing component 1022, a wireless sending/receiving component 1024, an antenna component 1026, and a signal processing part unique to a wireless interface. The processing component 1022 can further include one or more processors.

One processor of the processing components 1022 can be configured to perform the above method of implementing IoT device bootstrapping.

In an example, a non-transitory machine readable storage medium is further provided, which includes instructions executable by the processing component 1022 of the apparatus 1000 to perform the above method. For example, the non-transitory machine readable storage medium may be a ROM, a random-access memory (RAM), a CD-ROM, a magnetic tape, a floppy disk, and an optical data storage device, and so on.

A non-transitory machine readable storage medium storing machine instructions, where the instructions are executed by a processor of a base station to enable the base station to perform the method of implementing IoT device bootstrapping, including:

receiving bootstrapping information of a first device sent by the first device;

determining a second device to be connected with the first device; and sending the bootstrapping information of the first device to the second device.

Figure 11:
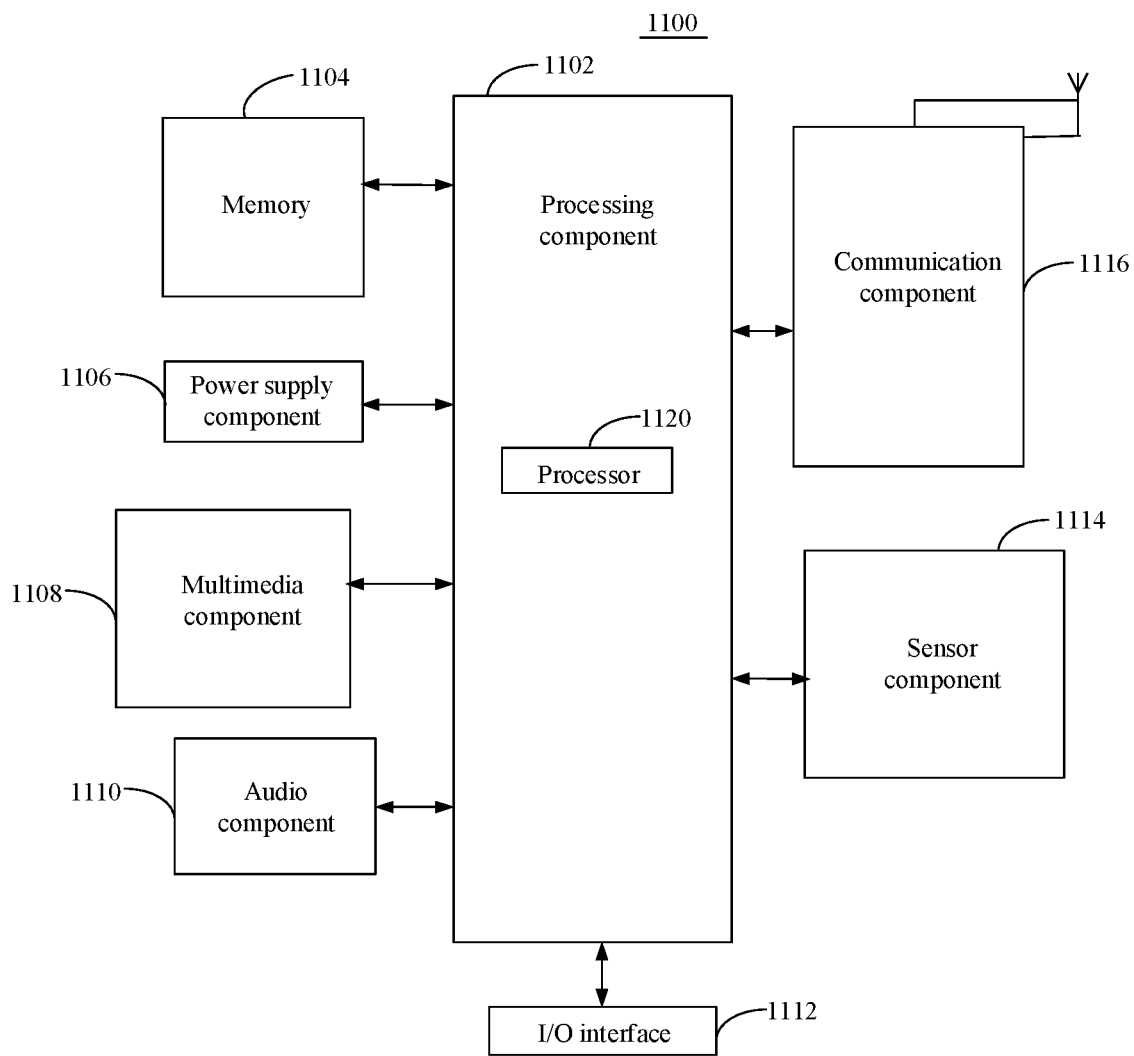
FIG. 11 is a block diagram illustrating an apparatus suitable for bootstrapping between IoT devices according to an example.

FIG. 11 is a block diagram illustrating an apparatus suitable for bootstrapping between IoT devices according to an example. For example, an apparatus 1100 may be a first device, such as a smartphone.

Referring to FIG. 11, the apparatus 1100 can include one or more of the following components: a processing component 1102, a memory 1104, a power supply component 1106, a multimedia component 1108, an audio component 1110, an input/output (I/O) interface 1112, a sensor component 1114 and a communication component 1116.

The processing component 1102 generally controls overall operations of the apparatus 1100, such as operations associated with display, phone calls, data communications, camera operations, and recording operations. The processing component 1102 may include one or more processors 1120 for executing instructions to complete all or a part of steps of the above method. In addition, the processing component 1102 may include one or more modules which facilitate the interaction between the processing component 1102 and other components. For example, the processing component 1102 may include a multimedia module to facilitate the interaction between the multimedia component 1108 and the processing component 1102.

The memory 1104 may be configured to store various types of data to support the operation of the apparatus 1100. Examples of such data include instructions for any application or method operated on the apparatus 1100, messages, pictures, and so on. The memory 1104 may be implemented by any type of volatile or non-volatile memory devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic, or compact disk.

The power supply component 1106 may provide power to different components of the apparatus 1100. The power supply component 1106 may include a power management system, one or more power supplies and other components associated with generating, managing, and distributing power for the apparatus 1100.

The multimedia component 1108 may include a screen providing an output interface between the apparatus 1100 and a user. In some examples, the screen may include a Liquid Crystal Display (LCD) and a Touch Panel (TP). If the screen includes the TP, the screen may be implemented as a touch screen to receive input signals from the user. The TP may include one or more touch sensors to sense touches, swipes, and gestures on the TP. The touch sensors may not only sense a boundary of a touch or swipe, but also sense a duration and a pressure associated with the touch or swipe. In some examples, the multimedia component 1108 may include a front camera and/or a rear camera. The front camera and/or rear camera may receive external multimedia data when the apparatus 1100 is in an operating mode, such as a photographing mode or a video mode. Each of the front camera and the rear camera may be a fixed optical lens system or have focal length and optical zooming capability.

The audio component 1110 may be configured to output and/or input an audio signal. For example, the audio component 1110 may include a microphone (MIC) configured to receive an external audio signal when the apparatus 1100 is in an operating mode, such as a call mode, a recording mode, and a voice recognition mode. The received audio signal may be further stored in the memory 1104 or sent via the communication component 1116. In some examples, the audio component 1110 further includes a speaker to output an audio signal.

The I/O interface 1112 provides an interface between the processing component 1102 and peripheral interface modules. The above peripheral interface modules may be a keyboard, a click wheel, buttons, and so on. These buttons may include, but are not limited to, a home button, a volume button, a starting button, and a locking button.

The sensor component 1114 may include one or more sensors to provide status assessments of various aspects for the apparatus 1100. For example, the sensor component 1114 may detect an on/off state of the apparatus 1100, and relative positioning of component, for example, the component is a display and a mini-keypad of the apparatus 1100. The sensor component 1114 may also detect a change in position of the apparatus 1100 or a component of the apparatus 1100, a presence or absence of the contact between a user and the apparatus 1100, an orientation or an acceleration/deceleration of the apparatus 1100, and a change in temperature of the apparatus 1100. The sensor component 1114 may include a proximity sensor configured to detect the presence of a nearby object without any physical contact. The sensor component 1114 may further include an optical sensor, such as a CMOS or CCD image sensor which is used in imaging applications. In some examples, the sensor component 1114 may further include an acceleration sensor, a gyroscope sensor, a magnetic sensor, a pressure sensor, or a temperature sensor.

The communication component 1116 may be configured to facilitate wired or wireless communication between the apparatus 1100 and other devices. The apparatus 1100 may access a wireless network that is based on a communication standard, such as Wi-Fi, 2G, 3G or a combination thereof. In an example, the communication component 1116 receives broadcast signals or broadcast-associated information from an external broadcast management system via a broadcast channel. In an example, the communication component 1116 further includes a Near Field Communication (NFC) module to facilitate short-range communications. For example, the NFC module may be implemented based on a Radio Frequency Identification (RFID) technology, an Infrared Data Association (IrDA) technology, an Ultra Wideband (UWB) technology, a Bluetooth® (BT) technology and other technologies.

In an example, the apparatus 1100 may be implemented by one or more Application Specific Integrated Circuits (ASIC), Digital Signal Processors (DSP), Digital Signal Processing Devices (DSPD), Programmable Logic Devices (PLD), Field Programmable Gate Arrays (FPGA), controllers, microcontrollers, microprocessors or other electronic components for performing the above method of implementing IoT device bootstrapping.

In an example, a non-transitory machine readable storage medium including instructions, such as a memory 1104 including instructions executable by a processor 1120 of the apparatus 1100 to perform the above method, is further provided. For example, the non-transitory machine readable storage medium may be a ROM, a random-access memory (RAM), a CD-ROM, a magnetic tape, a floppy disk, and an optical data storage device, and so on. When executed by the processor of the apparatus, the instructions in the storage medium enable the apparatus to perform the method for implementing IoT device bootstrapping, including:

receiving bootstrapping information of a second device sent by a CIoT base station; and establishing an IoT connection with the second device based on the bootstrapping information of the second device, where the second device obtains bootstrapping information of a first device through the CIoT base station.

Other implementations of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means in the related art that are not disclosed in the present disclosure. The specification and examples are considered as exemplary only, with a true scope and spirit of the present disclosure being indicated by the following claims.

It is to be understood that the present disclosure is not limited to the precise structure described above and shown in the accompanying drawings, and that various modifications and changes may be made without departing from the scope thereof. The scope of the present disclosure is limited only by the appended claims.

What is claimed is:

1. A method for implementing IoT device bootstrapping, being applicable to a first device, comprising: receiving bootstrapping information of a second device sent by a Cellular Internet of things (CIoT) base station, wherein the bootstrapping information comprises information required for Device Provisioning Protocol (DPP) authentication and configuration;
   sending bootstrapping information of the first device to the CIoT base station; and
   establishing an IoT connection with the second device based on the bootstrapping information of the second device, wherein the second device obtains bootstrapping information of the first device through the CIoT base station;
   wherein sending the bootstrapping information of the first device to the CIoT base station comprises:
   receiving a request message sent by the CIoT base station for acquiring the bootstrapping information of the first device, wherein the request message is sent by the CIoT in response to determining that the CIoT base station receives a request for acquiring the bootstrapping information of the first device sent by another IoT device and the bootstrapping information of the first device is not stored in the CIoT base station; and
   sending a response message corresponding to the request message to the CIoT base station, wherein the response message carries the bootstrapping information of the first device.

2. The method of claim 1, wherein sending the bootstrapping information of the first device to the CIoT base station further comprises: sending the bootstrapping information of the first device to the CIoT base station in a process of accessing the CIoT base station.

3. The method of claim 1, wherein sending the bootstrapping information of the first device to the CIoT base station further comprises: sending the bootstrapping information of the first device to the CIoT base station when an IoT connection to be established with another IoT device.

4. The method of claim 1, wherein the information required for DPP authentication and configuration comprises a public bootstrap key.

5. The method of claim 1, wherein the information required for DPP authentication and configuration comprises a global operating class.

6. The method of claim 1, wherein the information required for DPP authentication and configuration comprises a channel number list.

7. A first device, comprising:
   a processor; and
   a memory for storing processor executable instructions;
   wherein the processor is configured to;
   receive bootstrapping information of a second device sent by a Cellular Internet of things (CIoT) base station, wherein the bootstrapping information comprises information required for Device Provisioning Protocol (DPP) authentication and configuration;
   send bootstrapping information of the first device to the CIoT base station; and
   establish an IoT connection with the second device based on the bootstrapping information of the second device, wherein the second device obtains bootstrapping information of the first device through the CIoT base station;
   wherein sending the bootstrapping information of the first device to the CIoT base station comprises:
   receiving a request message sent by the CIoT base station for acquiring the bootstrapping information of the first device, wherein the request message is sent by the CIoT in response to determining that the CIoT base station receives a request for acquiring the bootstrapping information of the first device sent by another IoT device and the bootstrapping information of the first device is not stored in the CIoT base station; and
   sending a response message corresponding to the request message to the CIoT base station, wherein the response message carries the bootstrapping information of the first device.

8. The device of claim 7, wherein sending the bootstrapping information of the first device to the CIoT device comprises: sending the bootstrapping information of the first device to the CIoT base station in a process of accessing the CIoT base station.

9. The device of claim 7, wherein sending the bootstrapping information of the first device to the CIoT device further comprises: sending the bootstrapping information of the first device to the CIoT base station when an IoT connection to be established with another IoT device.

10. The device of claim 7, wherein the information required for DPP authentication and configuration comprises a public bootstrap key.

11. The device of claim 7, wherein the information required for DPP authentication and configuration comprises a global operating class.

12. The device of claim 7, wherein the information required for DPP authentication and configuration comprises a channel number list.

* * * * *